US012614898B2

(12) United States Patent
Du

(10) Patent No.: US 12,614,898 B2
(45) Date of Patent: Apr. 28, 2026

(54) MULTIFUNCTIONAL COMBINED CABLE STRIPPER

(71) Applicant: Huyu Du, Xuzhou (CN)

(72) Inventor: Huyu Du, Xuzhou (CN)

( * ) Notice: Subject to any disclaimer, the term of this patent is extended or adjusted under 35 U.S.C. 154(b) by 350 days.

(21) Appl. No.: 18/395,794

(22) Filed: Dec. 26, 2023

(65) Prior Publication Data

US 2024/0222946 A1     Jul. 4, 2024

(30) Foreign Application Priority Data

Dec. 30, 2022    (CN) .......................... 202223596874.7

(51) Int. Cl.
    *H02G 1/12*        (2006.01)
(52) U.S. Cl.
    CPC ................................. *H02G 1/1234* (2013.01)
(58) Field of Classification Search
    CPC .. H02G 1/1234; H02G 1/1214; H02G 1/1217; H02G 1/1219; B25B 7/22; H01R 43/042; H01R 43/0421
    See application file for complete search history.

(56) References Cited

U.S. PATENT DOCUMENTS

| | | | | |
|---|---|---|---|---|
| 3,283,404 A | * | 11/1966 | Hickman ............. | H02G 1/1214 |
| | | | | 30/91.2 |
| 3,525,107 A | * | 8/1970 | Hays .................... | H01R 43/042 |
| | | | | 72/409.13 |
| 3,733,627 A | * | 5/1973 | Epstein ................ | H01R 43/042 |
| | | | | 7/129 |
| 3,831,207 A | * | 8/1974 | Boyajian .............. | H02G 1/1214 |
| | | | | D8/58 |
| 3,947,905 A | * | 4/1976 | Neff ..................... | H02G 1/1214 |
| | | | | 7/107 |
| 4,009,514 A | * | 3/1977 | Couto .................. | H02G 1/1214 |
| | | | | 29/751 |
| 4,028,756 A | * | 6/1977 | Couto .................. | H01R 43/042 |
| | | | | 30/90.1 |
| 4,229,849 A | * | 10/1980 | Theiler, Sr. ............... | B25B 7/22 |
| | | | | 7/107 |
| 6,618,885 B1 | * | 9/2003 | Blaustein ............. | H02G 1/1214 |
| | | | | 81/9.41 |
| 7,210,378 B1 | * | 5/2007 | Bibi ......................... | B25B 7/02 |
| | | | | 81/9.41 |
| 9,466,956 B2 | * | 10/2016 | Zhang .................... | H02G 1/126 |

(Continued)

*Primary Examiner* — David B. Thomas
(74) *Attorney, Agent, or Firm* — WPAT, PC

(57) ABSTRACT

The multifunctional combined cable stripper includes a first clamp body and a second clamp body, which are hingedly connected through a hinge shaft. The hinge shaft is connected to a rotating disc through a loosening-tightening device, and the rotating disc is disposed with circularly arranged threading holes with different opening sizes. The first clamp body and the second clamp body are respectively defined with two arc-shaped grooves on adjacent sides of the first clamp body and the second clamp body, and the two arc-shaped grooves are pieced together to form a circular hole corresponding to the threading holes. A bottom of the arc-shaped groove of the second clamp body is embedded with a blade, and a cutting edge of the blade faces towards the hinge shaft and is arranged in the circular hole formed by the two arc-shaped grooves and further switchably located in any one of the threading holes.

7 Claims, 3 Drawing Sheets

(56) References Cited

U.S. PATENT DOCUMENTS

2003/0150062  A1 *    8/2003   Muirhead  ............ H02G 1/1214
                                                      7/108
2016/0294168  A1 *   10/2016   Hoppe  ...................... B25B 7/02

* cited by examiner

MULTIFUNCTIONAL COMBINED CABLE STRIPPER

TECHNICAL FIELD

The disclosure relates to the field of cable strippers, and particularly to a multifunctional combined cable stripper.

BACKGROUND

Cable strippers are one kind of commonly used tools for internal electricians, electric motor repairs, and instrumentation electricians, and are used by electricians to strip off surface insulation sheaths of head portions of electrical cables. The cable strippers can separate a cut-off insulation sheath of the cable from the cable and prevent electric shock.

However, the existing cable strippers still need external force to remove the insulation sheath of the head portion of the cable after circumferentially cutting the cable, which makes it inconvenient to peel off the insulation sheath of the cable completely, resulting in poor functionality of the existing cable strippers.

SUMMARY

An objective of the disclosure is to provide a multifunctional combined cable stripper, the multifunctional combined cable stripper is capable of fixing a position of a cable through a corresponding threading hole and using a blade in the corresponding threading hole to cut into a sheath of the cable, followed by pulling the cable to cut open the sheath of the cable. The operation of using the multifunctional combined cable stripper realizes the strip-off operation of the insulation sheath of the cable, and is convenient and labor-saving, making the functionality of the cable strippers stronger.

To achieve the above objective or other objectives, the disclosure proposes technical solutions as follows.

Specifically, a multifunctional combined cable stripper includes a first clamp body and a second clamp body, which are hingedly connected through a hinge shaft. The hinge shaft is connected to a rotating disc through a loosening-tightening device, and the rotating disc is disposed with circularly arranged threading holes with different opening sizes. The first clamp body and the second clamp body are respectively defined with two arc-shaped grooves on adjacent sides of the first clamp body and the second clamp body, and the two arc-shaped grooves are pieced together to form a circular hole corresponding to the threading holes. A bottom of the arc-shaped groove of the second clamp body is embedded with a blade. A cutting edge of the blade faces towards the hinge shaft, and is arranged in the circular hole formed by the two arc-shaped grooves and further switchably located in any one of the threading holes.

In an embodiment, the loosening-tightening device includes a blind rivet embedded in the hinge shaft, and a tightening-screw is in threaded connection with the blind rivet.

In an embodiment, a tip end of the first clamp body and the second clamp body is disposed with a clamping part, a stripping part, and a cutting part, sequentially in that order.

In an embodiment, a location of the first clamp body and the second clamp body near a handle is disposed with a pressing part.

In an embodiment, a diameter of the circular hole formed by the two arc-shaped grooves pieced together is greater than a diameter of one of the threading holes with a maximum diameter.

In an embodiment, shapes of the threading holes include a circle and a rectangle.

In an embodiment, a bottom of one of the threading hole located in a range of the circular hole is tangent to a bottom of the circular hole formed by the two arc-shaped grooves pieced together.

Compared with the related art, embodiments of the disclosure may achieve beneficial effects as follows.

The multifunctional combined cable stripper includes the threading holes with different opening sizes disposed on the rotating disc, which are used for threading cables with different sizes. The rotating disc can be rotated to drive a corresponding one of the threading holes with an opening size corresponding to the size of the cable to a position corresponding to the circular hole formed by the two arc-shaped grooves pieced together, and the rotating disc then is fixed by a loosening-tightening device. Meanwhile, the cutting edge of the blade is also located in the corresponding one of the threading holes. Subsequently, an end of the cable is first threaded into the corresponding one of the threading holes, and the cable then is pulled out from the end of the cable threaded into the corresponding one of the threading holes, so that the blade cuts open the insulation sheath of the cable, thereby realizing overall cutting and stripping of the insulation sheath of the cable, the operation is convenient, and functions and practicality of the cable stripper are increased consequently.

Figure 1:
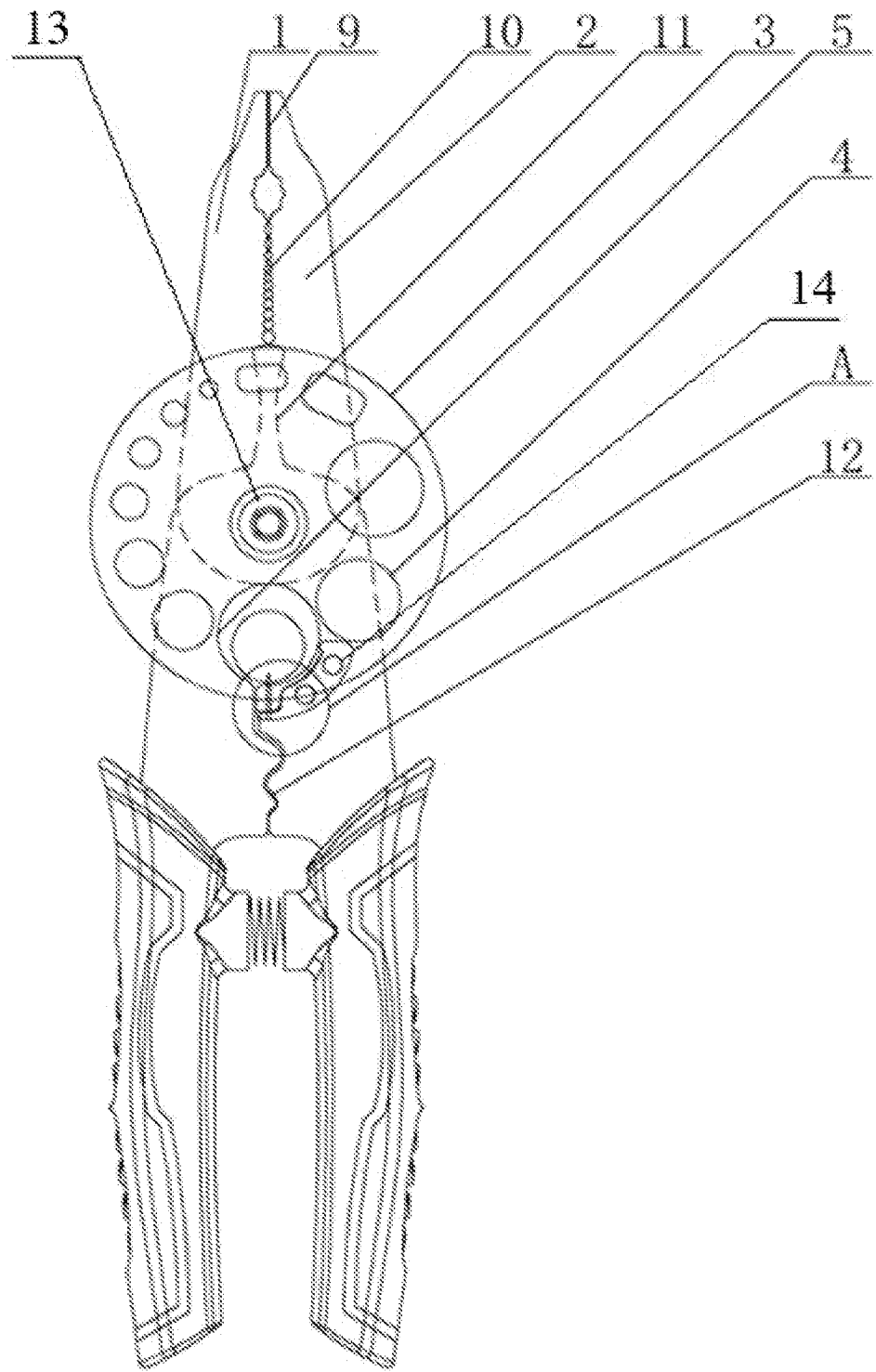
FIG. 1 illustrates a schematic structural diagram of a multifunctional combined cable stripper according to an embodiment of the disclosure.
Figure 2:
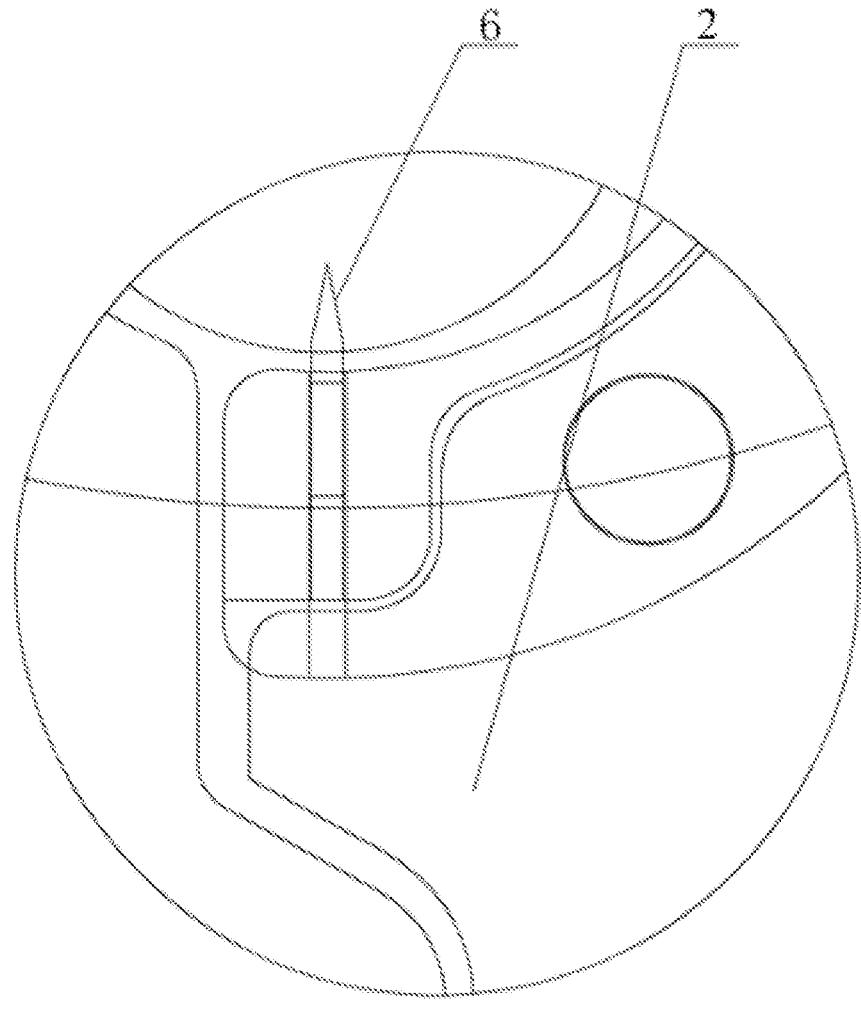
FIG. 2 illustrates a schematic enlarged structural view of the portion A of the multifunctional combined cable stripper illustrated in FIG. 1 according to an embodiment of the disclosure.
Figure 3:
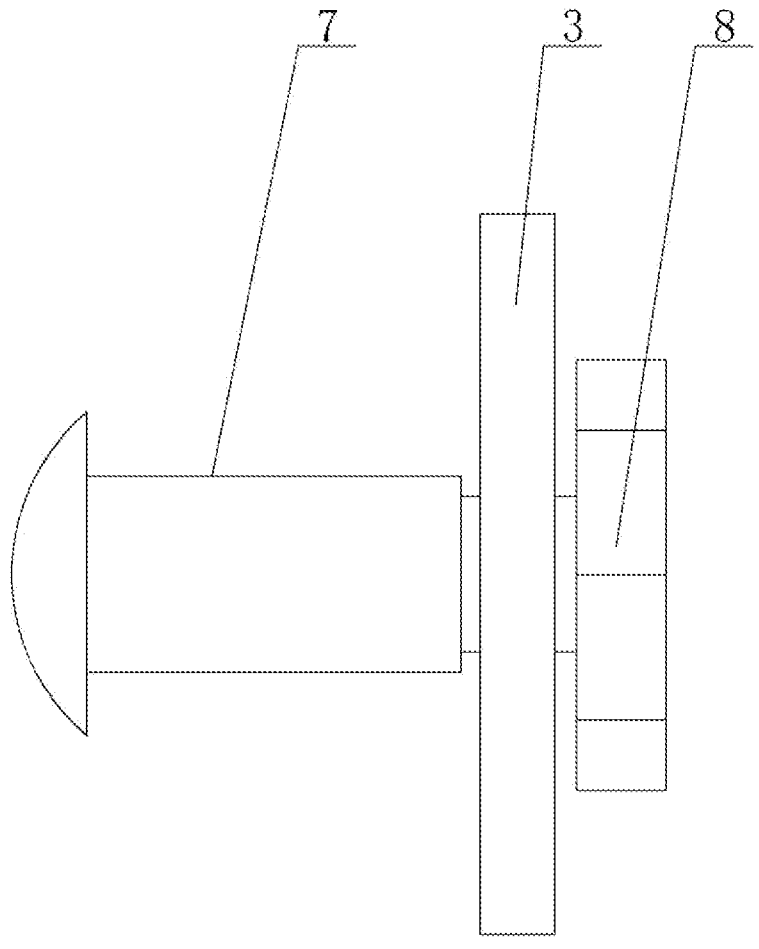
FIG. 3 illustrates a schematic structural diagram of a loosening-tightening device according to an embodiment of the disclosure.

In the accompanying drawings, description of numeral references is listed as follows:

1. first clamp body; 2. second clamp body; 3. rotating disc; 4. threading hole; 5. arc-shaped groove; 6. blade; 7. blind rivet; 8. tightening-screw; 9. clamping part; 10. stripping part; 11. cutting part; 12. pressing part; 13. hinge shaft; 14. arc-shaped clamp plate.

DETAILED DESCRIPTION OF EMBODIMENTS

The following will further elaborate on the disclosure in conjunction with specific implementation examples. It should be understood that the illustrated embodiments are merely used to illustrate the disclosure and not to limit the scope of protection of the disclosure. In addition, it should be understood that after reading the content taught in the disclosure, various modifications or amendments to the disclosure can be made by those skilled in the art, and these equivalent forms also fall within the scope of protection defined by the disclosure.

An embodiment of the disclosure provides a multifunctional combined cable stripper. A main structure of the multifunctional combined cable stripper includes a first clamp body 1 and a second clamp body 2, which are hingedly connected through a hinge shaft 13. The hinge shaft 13 is connected to a rotating disc 3 through a loosening-tightening device, and rotation and fixation of the rotating disc 3 can be achieved by tightness adjustment of the loosening-tightening device. The rotating disc 3 is disposed with circularly arranged multiple (i.e., more than one) threading holes 4 with different opening sizes, and the threading holes 4 with different opening sizes are used for cables of different sizes (e.g., diameters). The first clamp body 1 and the second clamp body 2 respectively are defined with two arc-shaped grooves 5 on adjacent sides of the first clamp body 1 and the second clamp body 2, the two arc-shaped grooves 5 are pieced together to form a complete circular hole corresponding to the multiple threading holes 4, and a diameter of the circular hole formed by the two arc-shaped grooves 5 pieced together is greater than a diameter of one of the multiple threading hole 4 with a maximum diameter, which makes the multiple threading hole 4 each can be located within a range of the circular hole formed by the two arc-shaped grooves 5. A bottom of the arc-shaped groove 5 of the second clamp body 2 is fixed with an arc-shaped clamp plate 14, and the arc-shaped groove 5 of the second clamp body 2 is embedded with a blade 6 through the arc-shaped clamp plate 14. A cutting edge of the blade 6 faces towards the hinge shaft 13, and is arranged in the circular hole formed by the two arc-shaped grooves 5 and further switchably located in any of threading hole 4 by rotation of the rotating disc 3. When the rotating disc 3 is rotated, the corresponding threading hole 4 with an opening size corresponding to a diameter of the cable is put in the circular hole formed by the two arc-shaped grooves 5, then the position of the rotating disc 3 is fixed by the loosening-tightening device, and afterwards an end of the cable is threaded into the corresponding threading hole 4. Subsequently, the entire cable is pulled from a side where the arc-shaped groove 5 is located to pass through the entire corresponding threading hole 4, so that the blade 6 can cut the sheath of the cable to peel off the sheath of the cable.

In an embodiment, the loosening-tightening device includes: a blind rivet 7 embedded in the hinge shaft 13, and a tightening-screw 8 in threaded connection with the blind rivet 7. An inner wall of the blind rivet 7 is provided with threads, and thus the blind rivet 7 can be engaged with other functional accessory through a screw. The rotation and fixation of the rotating disc 3 can be achieved by rotating-in and rotating-out the tightening-screw 8, respectively.

In an embodiment, a tip end (i.e., generally an end far away from the handle of the cable stripper) of the first clamp body 1 and the second clamp body 2 is disposed with a clamping part 9, a stripping part 10, and a cutting part 11, sequentially in that order. A location of the first clamp body 1 and the second clamp body 2 near a handle of the cable stripper is disposed with a pressing part 12. Specific implementation structures of the corresponding functions are all mature technologies in the prior art, and thus will not be elaborated herein. The addition of function for the cable stripper makes the disclosure more practical.

In an embodiment, shapes of the multiple threading holes 4 include a circle and a rectangle, which can cut cables of different shapes, making the cable stripper have a wider application range and more comprehensive functions.

In an embodiment, a bottom of the corresponding threading hole 4 switched to be located in the range of the circular hole is tangent to a bottom of the circular hole formed by the two arc-shaped grooves 5 pieced together, which can cut the sheath of the cable inside the corresponding threading hole 4 through a shorter length of the blade 6, thereby improving the strength of the blade 6, and to some extent ensuring the safety during use.

What is claimed is:

1. A multifunctional combined cable stripper, comprising: a first clamp body (1) and a second clamp body (2), which are hingedly connected through a hinge shaft (13);

wherein the hinge shaft (13) is connected to a rotating disc (3) through a loosening-tightening device, and the rotating disc (3) is disposed with circularly arranged threading holes (4) with different opening sizes, the first clamp body (1) and the second clamp body (2) are respectively defined with two arc-shaped grooves (5) on adjacent sides of the first clamp body (1) and the second clamp body (2), the two arc-shaped grooves (5) are pieced together to form a circular hole corresponding to the threading holes (4), a bottom of the arc-shaped groove (5) of the second clamp body (2) is embedded with a blade (6), and a cutting edge of the blade (6) faces towards the hinge shaft (13) and is arranged in the circular hole formed by the two arc-shaped grooves (5) and further switchably located in any one of the threading holes (4).

2. The multifunctional combined cable stripper as claimed in claim 1, wherein the loosening-tightening device comprises: a blind rivet (7) embedded in the hinge shaft (13), and a tightening-screw (8) in threaded connection with the blind rivet (7).

3. The multifunctional combined cable stripper as claimed in claim 1, wherein a tip end of the first clamp body (1) and the second clamp body (2) is disposed with a clamping part (9), a stripping part (10), and a cutting part (11), sequentially in that order.

4. The multifunctional combined cable stripper as claimed in claim 1, wherein a location of the first clamp body (1) and the second clamp body (2) near a handle is disposed with a pressing part (12).

5. The multifunctional combined cable stripper as claimed in claim 1, wherein a diameter of the circular hole formed by the two arc-shaped grooves (5) pieced together is greater than a diameter of one of the threading holes (4) with a maximum diameter.

6. The multifunctional combined cable stripper as claimed in claim 1, wherein shapes of the threading holes (4) comprise a circle and a rectangle.

7. The multifunctional combined cable stripper as claimed in claim 1, wherein a bottom of one of the threading hole (4) located in a range of the circular hole is tangent to a bottom of the circular hole formed by the two arc-shaped grooves (5) pieced together.

* * * * *